Patented Oct. 6, 1936

2,056,558

UNITED STATES PATENT OFFICE 2,056,558

MANUFACTURE OF BRICKS, SLABS, SHEETS, AND THE LIKE

George William Beldam, Lower Bourne, Farnham, England

No Drawing. Application May 4, 1932, Serial No. 609,280. In Great Britain May 7, 1931

3 Claims. (Cl. 106—23)

This invention has reference primarily to the manufacture of road paving blocks, slabs, and the like, one of the objects of which as regards blocks or slabs, is that they should possess the known advantages appertaining to both a wood block and a rubber block, while the known disadvantages of both wood blocks and rubber blocks are eliminated.

The invention has also reference to the manufacture of relatively thin carpets or coverings used for floors or other surfaces, which are made in lengths, and are stocked in rolls, and also mats, and other articles subjected to wear.

Articles manufactured according to this invention possess the following characteristics:—

1. They are compressible and resilient, and the liability of lateral displacement and creeping, as hereinafter specified, which takes place in the case of the use of rubber, is avoided.

2. They are relatively hard, so that they are not easily abraded, and are thus durable.

3. They reduce vibration, and deaden sound, and they are pleasant to walk upon and are not tiring to pedestrians.

4. They are practically impervious to moisture.

It is known that when wood in the form of blocks is used as a paving, they are only slightly resilient, and that the blocks, or some of them, by the traffic, especially heavy traffic, become compressed or deformed, and disintegrate and cause unevennesses on the surface of a road, and lose the slight resilience they may have possessed; and furthermore, the wood blocks absorb a large quantity of water, 9 times as much as blocks made according to this invention, which causes the pavement to expand, and upsets or disturbs it, tending to produce superficial irregularities, and destroy the usefulness of the pavement, and this is accentuated by the hammering action of the traffic, and undulations or waves are formed on the surfaces.

On the other hand, it is known, that in cases where rubber has been used, say more or less charged or mixed with materials other than rubber, such as wood meal chemical fillers or other mere fillers so called, the bodies or material, both in the case where articles of this material are used for roads, or for floor coverings, suffer from disintegration or stretching or creeping due to the incompressible nature of the material, and the difficulty of allowing for any outlet for its displacement, which displacement must have an outlet horizontally, caused by the downward weight of the traffic. To meet this displacement law, rubber blocks are often made of hard rubber layers alternating with soft rubber. The hard rubber on the surface is apt to be brittle, and the soft rubber displaces, which causes friction between the hard and soft substances, and disintegration, because there is no outlet for displacement. By the continuous action of being repeatedly displaced laterally, owing to non-compressibility vertically, the life and durability of the covering or paving is rendered relatively small.

In the manufacture of paving materials, such as blocks or slabs, or floor coverings, according to this invention, the mixture of rubber or latex component, and other material herein specified, is such that it possesses the following four characteristics, i. e. it is compressible, but has a substantial degree of hardness; is resilient; is practically non-absorbent of moisture, and also is not displaced at right angles to the direction of pressure applied to it; and it is the production or manufacture and use of a material for the purposes stated, having these characteristics, that is the chief object and effect of this invention.

A rubber compounded with mineral fillers to make it that degree of hardness necessary to withstand displacement would become too brittle to withstand abrasion from wear and tear of traffic.

But if a quantity of shavings according to this invention, is introduced into a mix, which mix by itself when vulcanized has the tendency to become brittle, the introduction of the shavings reduces this tendency.

This object and effect is obtained by the use of a special combination of ingredients, as hereinafter defined, comprising (1) crude or crepe rubber, or water dispersed rubber, or of latex suitably thickened or coagulated, and prepared and brought to the condition of that known to manufacturers of rubber goods as "rubber compound"; and (2) wood "shavings" rendered non-absorbent of moisture by specially treating it as hereinafter specified; and incorporating these substances or bodies together in about the proportion hereinafter given.

The term "rubber compound" used herein, except where otherwise stated, is to be taken to mean crude rubber, i. e. "crepe rubber", water dispersed rubber, or latex, which is worked or milled in the usual way of making "rubber compound" in rubber milling or treating machines, and in which operation certain chemicals or ingredients, such as "reinforcing" ingredients are worked into the rubber or latex, so as to "reinforce" it, and give it the character required.

The proportions of ingredients in the product for different species or qualities of articles vary in the ratios of between 80 parts by weight of "rubber compound" to 40 to 120 parts of prepared wood. Two examples are:—

*Example 1.*—For making pavings, namely, blocks for street or road or path or like pavements, as substitutes for ordinary wood block pavings, and "parquet" type of floors, the proportions may be about 80 parts of "rubber compound" to 120 parts of wood shavings. Blocks or slabs of this character are highly compressible and resilient, but do not, when under pressure, such as that caused by heavy traffic, become displaced laterally; and upon relief of the load and pressure, come back to their original shape and form, that is to say have the full quality of resiliency, and do away with the necessity for providing for an outlet for displacement laterally, because of its compressible nature.

*Example 2.*—For making ordinary comparatively thin floor coverings or "carpets" the proportions may advantageously be about 80 parts of rubber compound, and 40 parts of treated wood shavings.

The wood shavings do not act in the rubber compound as merely a "filler" or diluent, but they constitute really the basic foundation or body of the block or slab; while the rubber compound in it gives it the characteristics desired, namely, elasticity and resiliency, and other beneficial effects accruing from the use of rubber in road or street pavings; and resulting in a material which while having that quality of degree of hardness necessary to resist abrasion of the traffic, has such compressible quality as to need no outlet for displacement. And thus the "creeping" so prevalent in rubber carpets is reduced to a minimum, so as to be practically non-existent.

Regarding the quality of resiliency in this artificial wood block for road purposes, by a test, a wood block of 1⅝" deep was subjected to 8 to 10 tons pressure, and compressed, so that ½" was compressed, and on release it did not return but collapsed; whereas a block of the same dimensions made according to this invention, after compression with the same load, returned practically to its original size or position within 10 seconds; and this was with a material consisting of ⅔ treated wood shavings, and ⅓ rubber compound. Thus, by this manufacture, the detrimental characteristic of lateral displacement under pressure was practically eliminated; whereas with an all-rubber block displacement commences almost as soon as compression or pressure is applied.

On the other hand, with an all-wood block compression goes on till it collapses.

A wood-rubber block will compress about two-thirds of its depth before displacement takes place; that is when all compression possible has been taken up.

The same applies to the wood rubber compound carpet or floor coverings, except that in this case the proportion of ingredients may be about three-fifths of rubber compound, to two-fifths of treated wood shavings; but in this case, the compression in fact is slight, owing to the small weight of man compared with that of vehicles; so that there is a large margin in compression before any displacement can result, for displacement will only take place when all compression is taken up. With compounds in which no shavings have been introduced exactly the reverse characteristics have been proved by tests to exist. This result is most beneficial to "man" traffic, as the tread "answers" to the compression, whereas with rubber carpets the tread causes displacement, and results in "tiredness".

With regard to the use of the material wood shavings in this rubber or latex compound for paving blocks, or carpets and the like I have found that by using the wood in the form of shavings, it is possible to permeate or impregnate them with the rubber or latex, which takes place in the milling machines; and it has a different effect in the product from that produced by using wood meal merely mixed with rubber, as by the shavings becoming permeated, as well as surrounded by rubber the product or final compound in actual use is highly compressible, resulting in the characteristics or qualities above specified, whereas finely ground sawdust or wood meal can only be surrounded by rubber.

The shavings used in the manufactures according to this invention, to produce the grained or striated effects herein described, are wood cuttings produced by tools which are passed along wood in the direction of the grain, or conversely the wood passing the tools in the direction of length of its grain, or both; and these may be broken up into varying dimensions by friction rolls, or in teazing machines or the like, to produce pieces of some length of grain, and not in pulverulent or small granular form such as wood-meal or sawdust form where rubber can only surround the molecules.

The term "shavings" may however include the "shavings" such as are produced by rotary wood planing machines, the axes of the cutters of which are disposed transversely to the grain of the wood, where the rate of feed or travel of the wood is sufficiently rapid to produce more or less long cuttings, in which case they will be reduced to a shredded state by suitable machinery, so as to constitute a fibrous condition or appearance. In this condition they can be readily permeated with water-proofing material or rendered non-absorbent of moisture, so that the finished wood-rubber block, slab, or other article is non-absorbent of moisture, and therefore does not in use swell or ruck, but keeps its form.

Slabs such as are used for parquet purposes or "wood flooring" are capable of being polished by floor polishes of the usual kind; and when the slabs are differently coloured by incorporating suitable colouring materials with the rubber, or by dyeing the shavings, a parti-coloured general effect or pattern of grained appearance results.

With regard to the manufacture of the "rubber compound" this will be made in the usual manner, namely, it will be compounded of crude or crepe rubber, or latex, say brought to an equivalent state to the rubber, and with the usual chemicals introduced into it by "milling", i. e. in steam heated milling rolls or machinery of the known or usual kind; and while this compound is being produced, there is introduced into it the wood shavings, already rendered waterproof, so that they are thoroughly distributed into it, and impregnated with the rubber compound so as to produce a product which is homogeneous.

After the wood rubber compound has been mixed in the kind of machines usually employed in rubber manufacture, the compound is "sheeted" between calendar rolls to any required thickness, for building up by multi layers of the material into slabs (which may be vulcanized under pressure) of any required thickness; the thickness varying according to the width of the resulting blocks required, namely, parquet flooring blocks; and in this manufacture the desired thickness of the blocks is produced by cutting a slab by a saw or the like, to the thickness required, by which method the "grain" of the wood-rubber blocks for surface purposes runs longitudinally, giving the appearance of the grain of wood, which cutting is at right angles to the compressed shaving and rubber material.

Moreover, as the material is "sheeted" out through the calender, it will have a grained or striated appearance running all one way, that is in the direction at right angles to the calenders; and in building up the slabs as described, the grain may be crossed alternately in the different rolled layers of material, so as to prevent the grain in the built up slab running all in one direction, where such result is required.

In some cases colouring matter is used in the manufacture of the compound, in which case blocks of different sizes cut from different slabs produced as described will be coloured, and may be differently coloured; and the wood shavings may also be dyed to suit such colouring, so that any suitable juxtaposition of colour slabs or blocks can form or give any required design or effect.

In manufacturing this compound the treated wood shavings would be introduced in the manufacture of the material into the rubber compound, when the compound has received the chemicals and other like ingredients, and is nearly finished in its manufacture, namely, the wood shavings can be introduced into the compound nearly the last portion of its manufacture.

With further reference to the cutting of slabs suitable for use say in the manufacture or production of parquet flooring, when the slabs have been cut as described, the cut off portions may be cut in a vertical direction into the size and thickness required, by which operation a grain is produced in the direction required, namely, by the cutting, slabs or blocks can be produced showing the grain running in the longitudinal direction, or in a cross section producing a spotted or speckled surface.

For the purpose of producing wood rubber blocks or slabs as above described, it has been found by tests that the use of shavings, especially treated as described and permeated with the rubber, considerably reduce the elongation or breaking point of the vulcanized material.

For instance, assuming the material consists of a mixture of

| | |
|---|---|
| Pale crepe | 100 |
| China clay | 33 |
| Stearic acid | 3 |
| Zinc oxide | 5 |
| Sulphur | 1 |
| An accelerator | 1 |
| An anti-oxidant | 1 | this mixture when vulcanized has an elongation breaking point at 535 per cent and penetration point at 16.

If this compound is mixed with 3 parts of compound and 2 parts of treated wood shavings and vulcanized, the elongation breaking point is reduced to 75 per cent and penetration point to 5.

Further is has been found by introducing the same weight of wood meal as shavings into a rubber compound as above specified, the elongation was reduced from 535 per cent to 430 per cent; whereas with the material containing the shavings, the elongation was reduced from 535 per cent to 75 per cent, so that it is shown that whereas the wood meal was only a filler, the specially treated shavings produce the effects above described, and they constitute the basic foundation of the manufactured material, in which displacement is eliminated owing to the compressible character of the shavings treated and compounded or incorporated as above specified.

As an example of a mixture for the use in the manufacture of wood rubber blocks, the following has been found effective:—

| | |
|---|---|
| Smoked rubber sheet | 100 |
| Stearic acid | 2 |
| A softener | 3 |
| Zinc oxide | 10 |
| Sulphur | 3½ |
| An anti-oxidant | 1 |
| Carbon black | 15 |
| Mineral filler | 15 |
| An accelerator | 1½ |

Although the invention has been more particularly described above as applied to the manufacture of blocks, slabs or the like for use as paving material or articles for roads, streets or the like, and also to other articles or materials to be used for floor coverings, mats and the like, it can be applied in connection with the manufacture of articles which are subject to similar wear and tear such as soles and heels of boots and shoes, and for treads or covers of wheel tyres, as the material used for making wood rubber blocks and slabs as described, possesses both hardness and resistance to abrasive action; nevertheless they are compressible and resilient and overcome the displacement problem.

As a modified method of producing these slabs or material manufactured as above described, the compound may be forced through dies, that is extruded from dies by pressure in the shape or section required, and if desired in continuous lengths.

What is claimed is:—

1. A new composition of matter for the manufacture of slabs comprising wood shavings shredded to a particle size between limits 1.5 mm. and 5 mm. and of elongated form mixed with a vulcanizable rubber mix and vulcanized, the proportion of wood shavings to rubber being such that the wood shavings comprise between 20 to 80% of the total mix whereby the vulcanized slab will stand compression without displacement in a direction normal to the pressure applied.

2. A new composition of matter for the manufacture of slabs, comprising wood shavings of elongated form and mixed with a vulcanizable rubber mix until the wood shavings are reduced to a particle size between the limits 1.5 mm. and 5 mm. and vulcanized, the proportion of wood shavings to rubber being such that the wood shavings comprise between 20 to 80% of the total mix whereby the vulcanized slab will have its tendency to creep neutralized.

3. A new composition of matter for the manufacture of slabs, comprising wood shavings impregnated with a waterproofing agent and mixed with a vulcanizable rubber mix and shredded during mixing to a particle size of elongated form between the limits 1.5 mm. and 5 mm. and vulcanized, the proportion of wood shavings to rubber being such that the wood shavings comprise between 20 to 80% of the total mix whereby the vulcanized slab will stand compression without displacement in a direction normal to the pressure applied.

GEORGE W. BELDAM.